US012761820B2

(12) United States Patent
Sayyed et al.

(10) Patent No.: US 12,761,820 B2
(45) Date of Patent: Oct. 13, 2026

(54) MEMORY DIAGNOSTICS IN A HETEROGENEOUS COMPUTING PLATFORM

(71) Applicant: Dell Products L.P., Round Rock, TX (US)

(72) Inventors: Ibrahim Sayyed, Georgetown, TX (US); Adolfo S. Montero, Pflugerville, TX (US); Amit K. Tiwari, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 15 days.

(21) Appl. No.: 18/625,307

(22) Filed: Apr. 3, 2024

(65) Prior Publication Data

US 2025/0315175 A1 Oct. 9, 2025

(51) Int. Cl.
*G06F 3/06* (2006.01)

(52) U.S. Cl.
CPC .......... *G06F 3/0632* (2013.01); *G06F 3/0619* (2013.01); *G06F 3/0679* (2013.01)

(58) Field of Classification Search
CPC ..... G06F 3/0632; G06F 3/0619; G06F 3/0679
See application file for complete search history.

(56) References Cited

U.S. PATENT DOCUMENTS

| | | | | |
|---|---|---|---|---|
| 2013/0311823 A1* | 11/2013 | Kaplan | G06F 3/0673 | 714/15 |
| 2015/0206277 A1* | 7/2015 | Rao | G06T 1/60 | 345/543 |
| 2016/0103726 A1* | 4/2016 | Benedict | G06F 11/0787 | 714/48 |
| 2021/0183463 A1* | 6/2021 | Cowles | G11C 29/4401 | |
| 2021/0318922 A1* | 10/2021 | Roberts | G06F 11/0793 | |
| 2024/0070000 A1* | 2/2024 | Tsern | G06F 11/1008 | |

* cited by examiner

*Primary Examiner* — Eric T Loonan
(74) *Attorney, Agent, or Firm* — Fogarty LLP

(57) ABSTRACT

Systems and methods include an Information Handling System (IHS) that is adapted to provide memory diagnostics for use in identifying replaceable memory modules that are starting to fail. Upon initialization of an IHS that includes replaceable memory modules, a plurality of memory device drivers are loaded for use in accessing the replaceable memory modules. Each memory device driver is adapted to support a diagnostic API (Application Programming Interface). The IHS detects memory errors resulting from attempts throughout the IHS to access the replaceable memory modules. A memory address associated with the detected memory error is determined and the diagnostic API of a memory device driver is used to identify a specific replaceable memory module as the source of the memory error.

20 Claims, 4 Drawing Sheets

400

100

200

300

MEMORY DIAGNOSTICS IN A HETEROGENEOUS COMPUTING PLATFORM

FIELD

This disclosure relates generally to Information Handling Systems (IHSs), and more specifically, to systems and methods for IHS diagnostics.

BACKGROUND

As the value and use of information continues to increase, individuals and businesses seek additional ways to process and store it. One option available to users is an Information Handling System (IHS). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated.

Variations in IHSs allow for IHSs to be general or configured for a specific user or specific use, such as financial transaction processing, airline reservations, enterprise data storage, or global communications. In addition, IHSs may include a variety of hardware and software components that may be configured to process, store, and communicate information and may include one or more computer systems, data storage systems, and networking systems.

SUMMARY

In various embodiments, Information Handling Systems (IHSs) may include: one or more replaceable memory modules; one or more memory devices; and one or more processors coupled to the memory devices, wherein the memory devices comprise instructions that, upon execution by the processors, cause the IHS to: load a plurality of memory device drivers for accessing the replaceable memory modules, each memory device driver supporting a diagnostic API (Application Programming Interface); detect a memory error resulting from an attempt to access the replaceable memory modules; determine a memory address associated with the memory error; and utilize a diagnostic API of a first of the memory device drivers to identify a first of the replaceable memory modules as a source of the memory error.

In some embodiments, the memory device drivers are loaded as part of a boot sequence of the IHS. In some embodiments, the boot sequence comprises a UEFI (Unified Extensible Firmware Interface) boot sequence. In some embodiments, the loaded memory device driver is selected to correspond to a computing architecture of the one or more processors. In some embodiments, the computing architecture of the one or more processors comprises x86 or ARM (Advanced RISC Machine). In some embodiments, the IHS further includes an embedded controller that operates from a separate power plane from the one or more processors, wherein the embedded controller identifies the detected memory error in management of the replaceable memory modules. In some embodiments, the memory error comprises an error resulting from attempting to read or write to the memory address. In some embodiments, execution of the instructions by the processors further causes the IHS to track memory errors attributed to each of the replaceable memory modules. In some embodiments, execution of the instructions by the processors further causes the IHS to signal a fault in a first of the replaceable memory modules when the tracked memory errors attributed to the first replaceable memory module exceed a threshold level. In some embodiments, the fault is signaled in the first of the replaceable memory modules when the tracked memory errors attributed to the first replaceable memory module exceed a threshold level over a moving time interval. In some embodiments, diagnostic operations are initiated on the first replaceable memory module in response to the signaled fault. In some embodiments, execution of the instructions by the processors further causes the IHS to request a handle to the diagnostic API from each of the one or more memory device drivers. In some embodiments, the handle to the diagnostic API is utilized to identify the first of the replaceable memory modules as the source of the memory error.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

For purposes of this disclosure, an Information Handling System (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price.

An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components.

The terms "heterogenous computing platform," "heterogenous processor," or "heterogenous platform," as used herein, refer to an Integrated Circuit (IC) or chip (e.g., a System-On-Chip or "SoC," a Field-Programmable Gate Array or "FPGA," an Application-Specific Integrated Circuit or "ASIC," etc.) containing a plurality of discrete processing circuits or semiconductor Intellectual Property (IP) cores (collectively referred to as "SoC devices" or simply "devices") in a single electronic or semiconductor package, where each device has different processing capabilities suitable for handling a specific type of computational task. Examples of heterogenous processors include, but are not limited to: QUALCOMM's SNAPDRAGON, SAMSUNG's EXYNOS, APPLE's "A" SERIES, etc., which typically include ARM core(s).

Figure 1:
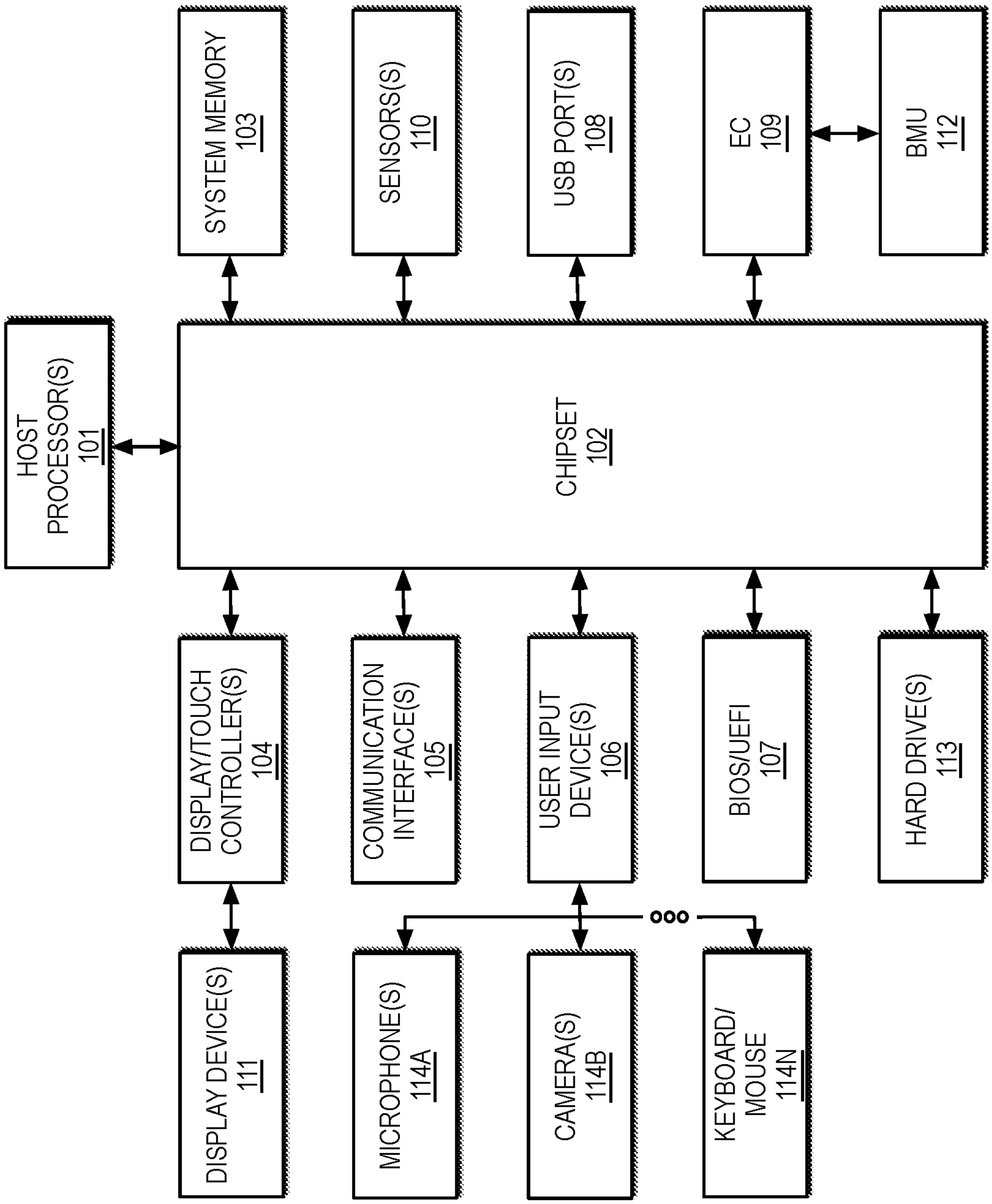
FIG. 1 is a diagram illustrating examples of components of an Information Handling System (IHS) that is configured, according to some embodiments, to support memory diagnostic operations by the IHS.

FIG. 1 is a block diagram of components of an IHS (Information Handling System) 100 that, in some embodiments, may include a heterogenous computing platform, as described in additional detail below, and that is configured to support memory diagnostic operations by the IHS, in particular to support memory diagnostics in which the IHS identifies specific replaceable memory modules that are the source of memory failures reported by hardware and/or software of the IHS. As depicted, IHS 100 includes host processor(s) 101. In various embodiments, IHS 100 may be a single-processor system, or a multi-processor system including two or more processors. Host processor(s) 101 may include any processor capable of executing program instructions, such as an INTEL/AMD x86 processor, or any general-purpose or embedded processor implementing any of a variety of Instruction Set Architectures (ISAs), such as a Complex Instruction Set Computer (CISC) ISA, a Reduced Instruction Set Computer (RISC) ISA (e.g., one or more ARM core(s), or the like).

IHS 100 includes chipset 102 coupled to host processor(s) 101. Chipset 102 may provide host processor(s) 101 with access to several resources. In some cases, chipset 102 may utilize a QuickPath Interconnect (QPI) bus to communicate with host processor(s) 101. Chipset 102 may also be coupled to communication interface(s) 105 to enable communications between IHS 100 and various wired and/or wireless networks, such as ETHERNET, WIFI, BLUETOOTH (BT), cellular or mobile networks (e.g., Code-Division Multiple Access or "CDMA," Time-Division Multiple Access or "TDMA," Long-Term Evolution or "LTE," etc.), satellite networks, or the like.

Communication interface(s) 105 may be used to communicate with peripherals devices (e.g., BT speakers, headsets, etc.). Moreover, communication interface(s) 105 may be coupled to chipset 102 via a Peripheral Component Interconnect Express (PCIe) bus, or the like. Chipset 102 may be coupled to display and/or touchscreen controller(s) 104, which may include one or more or Graphics Processor Units (GPUs) on a graphics bus, such as an Accelerated Graphics Port (AGP) or PCIe bus. As shown, display controller(s) 104 provide video or display signals to one or more display device(s) 111.

Display device(s) 111 may include Liquid Crystal Display (LCD), Light Emitting Diode (LED), organic LED (OLED), or other thin film display technologies. Display device(s) 111 may include a plurality of pixels arranged in a matrix, configured to display visual information, such as text, two-dimensional images, video, three-dimensional images, etc. In some cases, display device(s) 111 may be operate as a single continuous display, rather than two discrete displays.

Chipset 102 may provide host processor(s) 101 and/or display controller(s) 104 with access to system memory 103. In various embodiments, system memory 103 may be implemented using any suitable memory technology, such as static RAM (SRAM), dynamic RAM (DRAM) or magnetic disks, or any nonvolatile/Flash-type memory, such as a Solid-State Drive (SSD), Non-Volatile Memory Express (NVMe), or the like. In some embodiments, system memory 103 may include one or more replaceable memory modules, such as DIMM (Dual In-Line Memory Module) and cDIMM (compression-attached DIMM) memory modules that may be coupled to motherboard connectors of the IHS 100.

A variety of hardware and software may access these replaceable memory modules. Accordingly, errors resulting in attempting to read or write to system memory 103 may be generated by any of these hardware and software components of the IHS that access the system memory. As described in additional detail below, in embodiments, memory modules are configured during booting of an IHS 100 to support diagnostic memory operations that can be used in identifying a specific replaceable memory module that is the source of memory failures being reported by hardware and software of the IHS that is accessing system memory 103. In some embodiments, these operations that are used to identify a specific replaceable memory module that is the source of memory errors may be supported through the operation of memory device drivers used by processor(s) in accessing system memory 103. Through selection of different memory device drivers, embodiments may support memory diagnostics using processors 101 of different computing architectures.

In certain embodiments, chipset 102 may also provide host processor(s) 101 with access to one or more USB ports 108, to which one or more peripheral devices may be coupled (e.g., integrated or external webcams, microphones, speakers, etc.). Chipset 102 may further provide host processor(s) 101 with access to one or more hard disk drives, solid-state drives, optical drives, or other removable-media drives 113.

Chipset 102 may also provide access to one or more user input devices 106, for example, using a super I/O controller or the like. Examples of user input devices 106 include, but are not limited to, microphone(s) 114A, camera(s) 114B, and keyboard/mouse 114N. Other user input devices 106 may include a touchpad, stylus or active pen, totem, etc. Each of user input devices 106 may include a respective controller (e.g., a touchpad may have its own touchpad controller) that interfaces with chipset 102 through a wired or wireless connection (e.g., via communication interfaces(s) 105). In some cases, chipset 102 may also provide access to one or more user output devices (e.g., video projectors, paper printers, 3D printers, loudspeakers, audio headsets, Virtual/Augmented Reality (VR/AR) devices, etc.).

In certain embodiments, chipset 102 may further provide an interface for communications with one or more hardware sensors 110. Sensor(s) 110 may be disposed on or within the chassis of IHS 100, or otherwise coupled to IHS 100, and may include, but are not limited to: electric, magnetic, radio, optical (e.g., camera, webcam, etc.), infrared, thermal, force, pressure, acoustic (e.g., microphone), ultrasonic, proximity, position, deformation, bending, direction, movement, velocity, rotation, gyroscope, Inertial Measurement Unit (IMU), accelerometer, etc.

Basic Input/Output System (BIOS) 107 is coupled to chipset 102. Unified Extensible Firmware Interface (UEFI)

was designed as a successor to BIOS, and many modern IHSs utilize UEFI in addition to or instead of a BIOS. Accordingly, as used herein, the term "BIOS" is intended to also encompass UEFI such that these terms may be used interchangeably. In operation, UEFI 107 provides an abstraction layer that allows the OS to interface with certain hardware components of the IHS 100. Upon booting of IHS 100, host processor(s) 101 may utilize program instructions of UEFI 107 to initialize and test hardware components that are coupled to IHS 100, and to load host OS 312 for use by IHS 100. Via the hardware abstraction layer provided by UEFI, software applications executed by host processor(s) 101 and/or SoCs 200 can interface with certain I/O devices that are coupled to IHS 100.

As described in additional detail below, booting of IHS 100 may be conducted according to boot sequence procedures, such as according to a UEFI 107 boot sequence. During the boot sequence of an IHS 100, embodiments may load memory device drivers, initially for use by processors 101 during the boot process itself, that are adapted to support UEFI queries in support of memory diagnostics. In particular, UEFI 107 may include a UEFI memory diagnostics module 321 that is loaded during the boot sequence once the memory device drivers have been identified. The UEFI memory diagnostics module 321 monitors for memory failures that may be reported by a variety of hardware and software of the IHS when attempting to read, write or otherwise access system memory 103, and in particular replaceable memory modules. When a memory failure is detected, the UEFI memory diagnostics module 321 interfaces with a diagnostic API supported by the adapted memory device drivers in order to identify the specify replaceable memory module where a memory failure has occurred. Through such monitoring, the UEFI memory diagnostics module 321 may track reported errors as being attributed to each of the memory modules in identifying modules with a greater number and frequency of errors and thus indicating degraded performance.

Embedded Controller (EC) 109 (sometimes referred to as a Baseboard Management Controller or "BMC") includes a microcontroller unit or processing core dedicated to handling selected IHS operations not ordinarily handled by host processor(s) 101. Examples of such operations may include, but are not limited to: power sequencing, power management, receiving and processing signals from a keyboard or touchpad, as well as operating chassis buttons and/or switches (e.g., power button, laptop lid switch, etc.), receiving and processing thermal measurements (e.g., performing cooling fan control, CPU and GPU throttling, and emergency shutdown), controlling indicator Light-Emitting Diodes or "LEDs" (e.g., caps lock, scroll lock, num lock, battery, ac, power, wireless LAN, sleep, etc.), managing a battery charger and a battery, enabling remote management, diagnostics, and remediation over an OOB or sideband network, etc.

Unlike other devices in IHS 100, EC 109 may be operational from IHS being powered, in particular before other devices are fully running or even powered. As such, EC 109 firmware may be responsible for interfacing with a power adapter to manage the various power states that may be supported by IHS 100. Power operations of the EC 109 may also provide other components of the IHS 100 with power status information for the IHS, such as whether IHS 100 is operating from battery power or is plugged into an AC power source. Firmware instructions utilized by EC 109 may be used to manage other core operations of IHS 100 (e.g., turbo modes, maximum operating clock frequencies of certain components, etc.).

From the perspective of users, IHS 100 may appear to be either "on" or "off," without any other detectable power states. In some embodiments, however, an IHS 100 may support multiple power states that may correspond to the states defined in the Advanced Configuration and Power Interface (ACPI) specification, such as: S0, S1, S2, S3, S4, S5, and G3. For example, when an IHS 100 is operating in S0 working mode, the IHS is operational, but some hardware components that are not in use may still be individually configured in low power states. In an S0 low-power, idle mode ("Sleep" or "Modern Standby"), an IHS 100 remains partially running with various capabilities of the IHS (e.g., displays, network controllers) may be powered down and other capabilities (e.g., EC, processors) may be in low-power standby modes, thus supporting the ability of the IHS to quickly transition from to a full-power, working S0 mode in response to various events. In the past, S3 was commonly used as a default "Sleep state." However, many IHSs 100 utilize the described Modern Standby, which may be designated as a hybrid "S0ix" mode, where some or all of the internal hardware of IHS 100 may be placed into their lowest power state, while still supporting code execution that allows fast response and transition of the IHS to a working S0 mode.

An IHS 100 may additionally or alternatively support other low-power modes, such as S1-S3 (that may also be referred to as "Sleep" modes), where the IHS may appear to users to be in an off state. Some IHSs may support only one or two of these states, where the number of distinct states may be a reflection of power saving features of the IHS that have been selected for use. For instance, the amount of power consumed in states S1-S3 is less than S0 and more than S4. An S3 mode consumes less power than S2, and S2 consumes less power than S1. In states S1-S3, volatile memory may be periodically refreshed in order to maintain the operating state of the IHS, with some components remaining powered so that the IHS may wake based on inputs from a keyboard, Local Area Network (LAN), or a Universal Serial Bus (USB) device.

In the S4 state ("Hibernate"), power consumption is reduced to its lowest level. The IHS saves the contents of volatile memory to a hibernation file and some components remain powered, allowing the IHS to wake based on detected input from the keyboard, LAN, or a USB device. "Hybrid sleep" may implemented by some IHSs may use a hibernation file that is used to save the IHS's operating state, and also used to resume the IHSs operations upon reverting to a working S0 mode. "Fast startup" may refer to a power state where the user is logged off before the hibernation file is created, which allows for a smaller hibernation file in IHSs with reduced storage capabilities.

When in the S5 state ("Soft off" or "Full Shutdown"), an IHS 100 is fully shut down without a hibernation file. It occurs when a restart is requested or when an application invokes a shutdown command of the OS, EC 109, etc. During a full shutdown and re-boot, the user session is methodically de-constructed and restarted on the next boot. In some instances, a boot/startup from an S5 state takes significantly longer than resuming from S1-S4 states. At the hardware level, the main difference between S4 and S5 may be that S4 sets a flag on the storage device used to store the hibernation file and configures the bootloader to boot from the flagged hibernation file instead of booting the OS from scratch.

In a G3 ("Mechanical off") power mode, the IHS 100 may be completely turned off and consumes absolutely no power from its Power Supply Unit (PSU) or main battery (e.g., a lithium-ion battery), with the exception of any Real-Time Clock (RTC) batteries (e.g., Complementary Metal Oxide Semiconductor or "CMOS" batteries, Basic Input/Output System or "BIOS" batteries, coin cell batteries, etc.), which are used to provide power for the IHS's internal clock/calendar and for maintaining certain configuration settings. In some instances, G3 represents the lowest possible power configuration of an IHS from which the IHS can be initialized. From a G3 mode, an IHS may transition to an S5 mode in response to AC power source coupling (i.e., transitioning between battery mode to AC mode). Additionally, or alternatively, an IHS may transition from G3 to S0 based upon the detection of a power button event.

EC 109 firmware may also implement operations for detecting certain changes to the physical configuration or posture of IHS 100 (such as a laptop computer), and may also manage operations of other IHS devices based on the current physical configuration of IHS 100. For instance, when IHS 100 as a 2-in-1 laptop/tablet form factor, EC 109 may receive inputs from a lid position or hinge angle sensor 110, and may use those inputs to determine: whether the two sides of IHS 100 have been latched together to a closed position or a tablet position, the magnitude of a hinge or lid angle, etc. In response to these changes, the EC 109 may enable or disable certain features of IHS 100 (e.g., front or rear facing camera, etc.).

In this manner, EC 109 may identify any number of IHS physical postures, including, but not limited to: laptop, stand, tablet, or book. For example, when an integrated display 111 of IHS 100 is open with respect to a horizontal, face-up position of an integrated keyboard, EC 109 may determine IHS 100 to be in a laptop posture. When an integrated display 111 of IHS 100 is open with respect to a horizontal keyboard portion, but the keyboard is facing down (e.g., its keys are against the top surface of a table), EC 109 may determine IHS 100 to be in a kickstand posture. When the back of an integrated display 111 is closed against the back of the keyboard portion of an IHS, EC 109 may determine IHS 100 to be folded in a tablet posture. When IHS 100 has two integrated displays 111 that are open side-by-side (e.g., in a hybrid laptop with displays in both panels), EC 109 may determine an IHS 100 to be in a book posture. When an IHS 100 is determined to be in a book posture, EC 109 may also determine if the display(s) 111 of IHS 100 are arranged in a landscape or portrait orientation, relative to the user.

In some implementations, EC 109 may be installed as a Trusted Execution Environment (TEE) component to the motherboard of IHS 100. Accordingly, as a component with the root of trusted hardware of IHS 100, EC 109 may be further configured to calculate hashes or signatures that uniquely identify individual components of IHS 100. In such scenarios, EC 109 may calculate a hash value based on the configuration of a hardware and/or software component coupled to IHS 100. For instance, EC 109 may calculate a hash value based on all firmware and other code or settings stored in an onboard memory of a hardware component.

Hash values may be calculated as part of a trusted process of manufacturing IHS 100 and may be maintained in secure storage as a reference signature. EC 109 may later recalculate a hash value based on instructions and settings loaded for use by a hardware component of IHS 100 and may compare the calculated value against the reference hash value to determine if any modifications have been made to the component, thus indicating that the component has been compromised. As such, EC 109 may validate the integrity of hardware and software components installed in IHS 100.

In some embodiments, EC 109 may provide an OOB (Out-Of-Band) or sideband channel that allows an ITDM or Original Equipment Manufacturer (OEM) to manage various settings and configurations of an IHS 100. OOB is used in contradistinction with "in-band" communication channels that operate only after networking 105 other interfaces of the IHS have been initialized, and the OS of the IHS has been successfully booted.

In various embodiments, IHS 100 may be coupled to an external power source through an AC adapter, power brick, or the like. The AC adapter may be removably coupled to a battery charge controller to provide IHS 100 with a source of DC power provided by battery cells of a battery system in the form of a battery pack (e.g., a lithium ion or "Li-ion" battery pack, or a nickel metal hydride or "NiMH" battery pack including one or more rechargeable batteries). Battery Management Unit (BMU) 112 may be coupled to EC 109 and it may include, for example, an Analog Front End (AFE), storage (e.g., non-volatile memory), and a microcontroller. In some cases, BMU 112 may be configured to collect and store information, and to provide that information to other IHS components, such as, for EC 109 and/or other devices within heterogeneous computing platform 200 (FIG. 2).

Examples of information collectible by BMU 112 may include, but are not limited to: operating conditions (e.g., battery operating conditions including battery state information such as battery current amplitude and/or current direction, battery voltage, battery charge cycles, battery state of charge, battery state of health, battery temperature, battery usage data such as charging and discharging data; and/or IHS operating conditions such as processor operating speed data, system power management and cooling system settings, state of "system present" pin signal), environmental or contextual information (e.g., such as ambient temperature, relative humidity, system geolocation measured by GPS or triangulation, time and date, etc.), etc.

In some embodiments, IHS 100 may not include all the components shown in FIG. 1. In other embodiments, IHS 100 may include other components in addition to those that are shown in FIG. 1. Furthermore, some components that are represented as separate components in FIG. 1 may instead be integrated with other components, such that all or a portion of the operations executed by the illustrated components may instead be executed by the integrated component.

Figure 2:
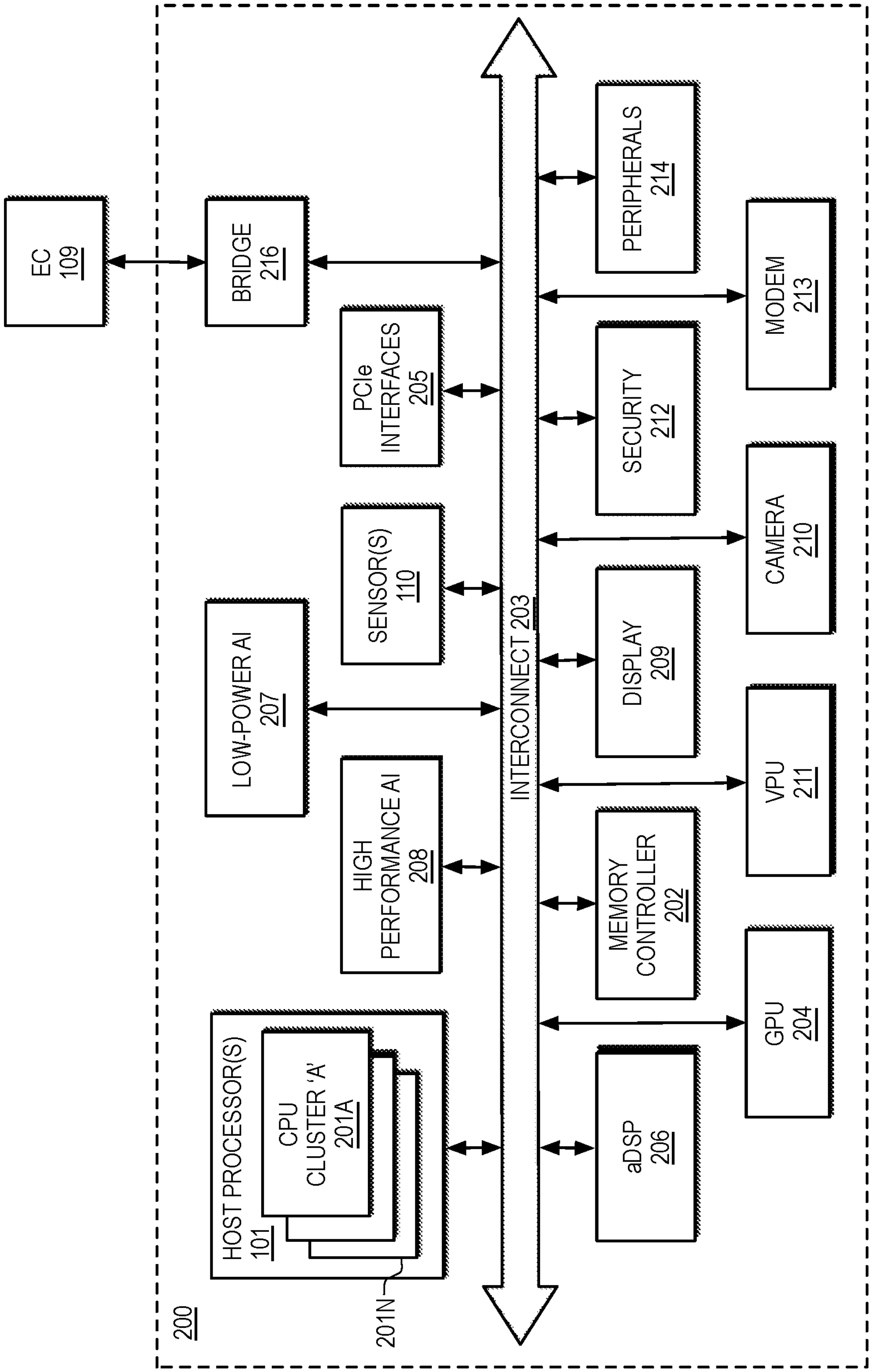
FIG. 2 is a diagram illustrating an example of a heterogenous computing platform configured, according to some embodiments, to support memory diagnostic operations.

For instance, in various embodiments, host processor(s) 101 and/or other components shown in FIG. 1 (e.g., chipset 102, display controller(s) 104, communication interface(s) 105, EC 109, etc.) may be replaced by devices within heterogenous computing platform 200 (FIG. 2). As such, IHS 100 may assume different form factors including, but not limited to: servers, workstations, desktops, laptops, appliances, video game consoles, tablets, smartphones, etc.

Historically, IHSs with desktop and laptop form factors have had conventional host OSs executed on INTEL or AMD's "x86"-type processors. Other types of processors, such as ARM processors, have been used in smartphones and tablet devices, which typically run thinner, simpler, and/or mobile OSs (e.g., ANDROID, IOS, WINDOWS MOBILE, etc.). More recently, however, IHS manufacturers have started producing fully-fledged desktop and laptop IHSs equipped with ARM-based, heterogeneous computing platforms. Accordingly, host OSs (e.g., WINDOWS on ARM) have been developed to provide users with a familiar OS experience on those platforms.

FIG. 2 is a diagram illustrating an example of heterogenous computing platform 200 configured to support memory diagnostic operations, in particular memory diagnostic operations that identify memory modules that are the source of errors reported by the heterogenous computing platform 200. In some embodiments, the memory diagnostic operations may provide root cause information for memory failures impacting the operation of the heterogenous computing platform 200, but the platform 200 is unable to diagnose the cause of these memory failures due to virtualization of the actual IHS hardware.

In various embodiments, heterogenous computing platform 200 may be implemented in one or more SoCs, FPGAs, ASICs, or the like. Heterogenous computing platform 200 may include one or more discrete and/or segregated devices or components, each having a different set of processing capabilities suitable for handling a particular type of computational task. When each device in platform 200 is tasked with executing only the types of computational tasks that it is specifically designed to execute, the overall power consumption of heterogenous computing platform 200 is minimized.

In various implementations, some of the devices in heterogenous computing platform 200 may include their own microcontroller(s) or core(s) (e.g., ARM core(s)) and corresponding firmware. In some cases, a device in platform 200 may also include its own hardware-embedded accelerator (e.g., a secondary or co-processing core coupled to a main core). Each device in heterogenous computing platform 200 may be accessible through a respective Application Programming Interface (API). Additionally, or alternatively, some devices in heterogenous computing platform 200 may execute their own OS. Additionally, or alternatively, one or more of the devices of heterogenous computing platform 200 may be virtual devices and may thus operate virtual machines.

In some embodiments, heterogenous computing platform 200 includes CPU clusters 201A-N that may correspond to system processor(s) 101, and that are intended to perform general-purpose computing operations. Each of CPU clusters 201A-N may include one or more processing cores and cache memories. In operation, CPU clusters 201A-N are available and accessible to the IHS's host OS 312 (e.g., WINDOWS on ARM) and other applications executed by IHS 100.

CPU clusters 201A-N may be coupled to memory controller 202 via internal interconnect fabric 203. Memory controller 202 may be responsible for managing system memory access for all of devices connected to internal interconnect fabric 203, which may include any communication bus suitable for inter-device communications within an SoC (e.g., Advanced Microcontroller Bus Architecture or "AMBA," QuickPath Interconnect or "QPI," HyperTransport or "HT," etc.). All devices coupled to internal interconnect fabric 203 may communicate with each other and with a host OS executed by CPU clusters 201A-N. In some cases, devices 209-211 may be coupled to internal interconnect fabric 203 via a secondary interconnect fabric (not shown). A secondary interconnect fabric may include any bus suitable for inter-device and/or inter-bus communications within an SoC.

A GPU 204 of the heterogenous computing platform 200 produces graphical or visual content and communicates that content to a monitor or display of the IHS 100 for rendering. In some embodiments, display engine 209 may be designed to perform additional video enhancement operations. In operation, display engine 209 may implement procedures for provide the output of GPU 204 as a video signal to one or more external displays coupled to IHS 100 (e.g., display device(s) 111). PCIe interfaces 205 provide an entry point into any additional devices external to heterogenous computing platform 200 that have a respective PCIe interface (e.g., graphics cards, USB controllers, etc.).

Audio Digital Signal Processor (aDSP) 206 is a device designed to perform audio and speech operations and to perform in-line enhancements for audio input(s) and output(s). Examples of audio and speech operations include, but are not limited to: noise reduction, echo cancellation, directional audio detection, wake word detection, muting and volume controls, filters and effects, etc. In operation, input and/or output audio streams may pass through and be processed by aDSP 206, which can send the processed audio to other devices on internal interconnect fabric 203 (e.g., CPU clusters 201A-N). In some embodiments, aDSP 206 may be configured to process one or more of heterogenous computing platform 200's sensor signals (e.g., gyroscope, accelerometer, pressure, temperature, etc.), low-power vision or camera streams (e.g., for user presence detection, onlooker detection, etc.), or battery data (e.g., to calculate a charge or discharge rate, current charge level, etc.).

Camera device 210 includes an Image Signal Processor (ISP) configured to receive and process video frames captured by a camera coupled to heterogenous computing platform 200 (e.g., in the visible and/or infrared spectrum). Video Processing Unit (VPU) 211 is a device designed to perform hardware video encoding and decoding operations, thus accelerating the operation of camera 210 and display/graphics device 209. VPU 211 may be configured to provide optimized communications with camera device 210 for performance improvements.

Sensor hub 207 may include AI capabilities designed to consolidate information received from other devices in heterogenous computing platform 200, process context and/or telemetry data streams, and provide that information to: (i) a host OS, (ii) other applications, and/or (iii) other devices in platform 200. In collecting data, sensor hub 207 may include General-Purpose Input/Output (GPIOs) that provide Inter-Integrated Circuit ($I^2C$), Improved $I^2C$ ($I^3C$), Serial Peripheral Interface (SPI), Enhanced SPI (eSPI), and/or serial interfaces to receive data from sensors (e.g., sensors 110, camera 210, peripherals 214, etc.). Sensor hub 207 may include a low-power core configured to execute small neural networks and specific applications, such as contextual awareness and other enhancements.

High-performance AI device 208 is a significantly more powerful processing device than sensor hub 207, and it may be designed to execute multiple complex AI algorithms and models concurrently (e.g., Natural Language Processing, speech recognition, speech-to-text transcription, video processing, gesture recognition, user engagement determinations, etc.). For example, high-performance AI device 208 may include a Neural Processing Unit (NPU), Tensor Processing Unit (TPU), Neural Network Processor (NNP), or Intelligence Processing Unit (IPU), and it may be designed specifically for AI and Machine Learning (ML), which speeds up the processing of AI/ML tasks while also freeing processor(s) 101 to perform other tasks. Using such capabilities, one or more devices of heterogeneous computing platform 200 (e.g., GPU 204, aDSP 206, sensor hub 207, high-performance AI device 208, VPU 211, etc.) may be configured to execute one or more AI model(s), simulation(s), and/or inference(s).

Security device 212 may include one or more specialized security components, such as a dedicated security processor, a Trusted Platform Module (TPM), a TRUSTZONE device, a PLUTON processor, or the like. In various implementations, security device 212 may be used to perform cryptography operations (e.g., generation of key pairs, validation of digital certificates, etc.) and/or it may serve as a hardware root-of-trust (RoT) for heterogenous computing platform 200 and/or IHS 100.

Modem/wireless controller 213 may be designed to enable wired and wireless communications in any suitable frequency band (e.g., BLUETOOTH or "BT," WiFi, CDMA, 5G, satellite, etc.), subject to AI-powered optimizations/customizations for improved speeds, reliability, and/or coverage. Peripherals 214 may include any device coupled to heterogenous computing platform 200 (e.g., sensors 110) through mechanisms other than PCIe interfaces 205. In some cases, peripherals 214 may include interfaces to integrated devices (e.g., built-in microphones, speakers, and/or cameras), wired devices (e.g., external microphones, speakers, and/or cameras, Head-Mounted Devices/Displays or "HMDs," printers, displays, etc.), and/or wireless devices (e.g., wireless audio headsets, etc.) coupled to IHS 100, where configuration of such hardware may be via modifications to UEFI variables corresponding to a respective hardware component.

In some implementations, EC 109 may be integrated into heterogenous computing platform 200 of IHS 100. In other implementations EC 109 may be external to the heterogenous computing platform 200 (i.e., the EC 109 residing in its own semiconductor package) but coupled to integrated bridge 216 via an interface (e.g., enhanced SPI or "eSPI"), thus supporting the EC's ability to access the SoC's internal interconnect fabric 203, including sensor hub 207 and sensor(s) 110. Through this connectivity supported by the interconnect fabric 203, EC 109 may directly access and/or operate most or all of devices 201-216, 110 of the heterogenous computing platform 200.

Figure 3:
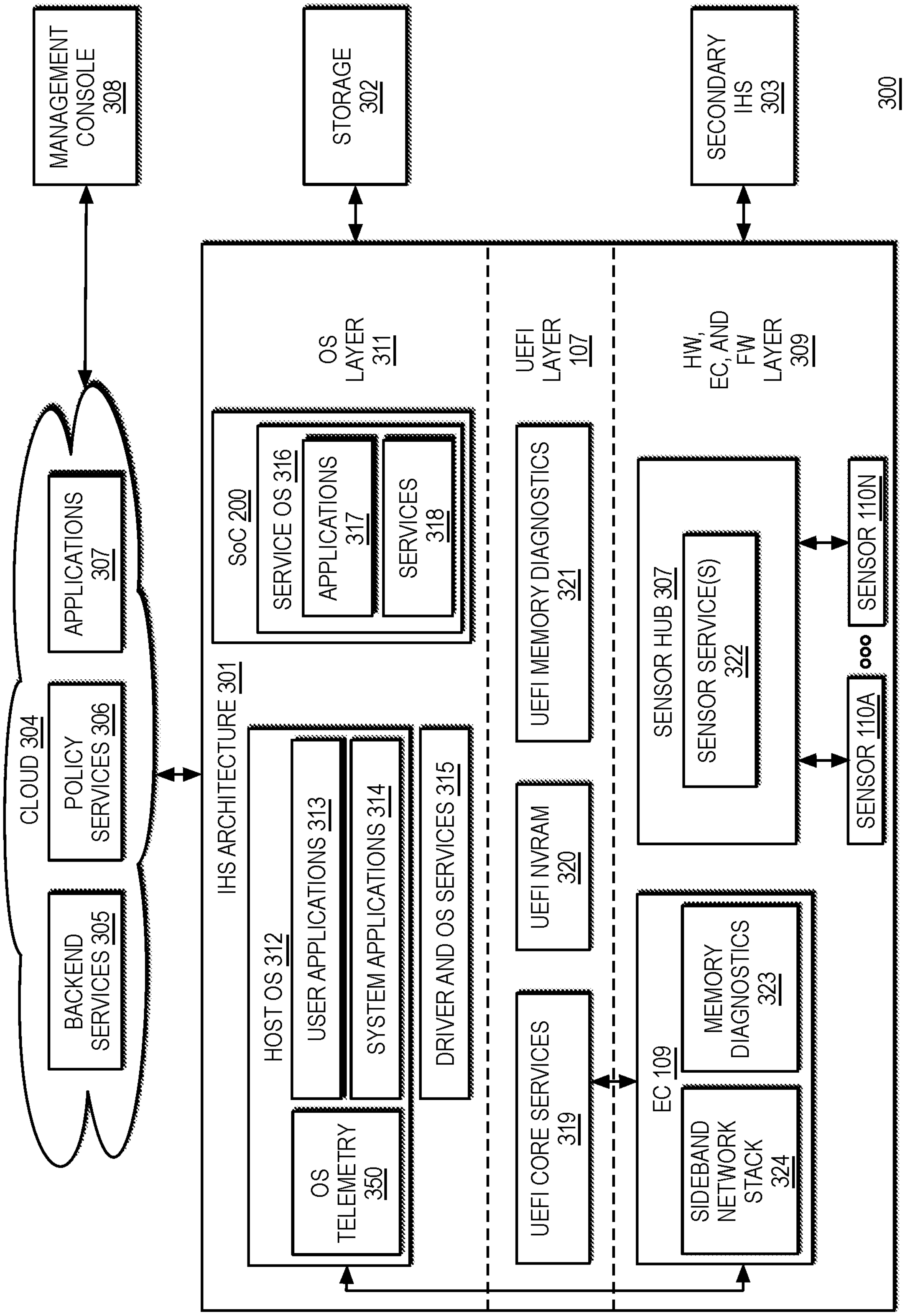
FIG. 3 is a diagram illustrating an example of a system, according to some embodiments, for supporting memory diagnostic operations by an IHS.

FIG. 3 is a diagram illustrating an example of architecture 300 for supporting memory diagnostic operations by an IHS. Embodiments provide memory diagnostics that identity specific replaceable memory modules that are source memory errors in an IHS 100. In many instances, replaceable memory modules are generally more error-prone as they age, with the conditions in which the memory module is operated influencing the module's longevity. As replaceable components, identifying when memory modules should be replaced due to degraded performance supports timely replacement of aging modules and maintains optimal memory performance by the IHS 100.

As described, a variety of OS 312, 316 applications may report errors in accessing replaceable memory modules. In addition, firmware used to operate various hardware components, such as network controller 105 and storage driver 113, may read and write data to these replaceable memory modules. Any of these hardware or software components of an IHS 100 may receive error messages when interfacing with these replaceable memory modules. When these components utilize these replaceable memory modules, no distinction is made between the separate modules. For example, in a scenario where the replaceable memory modules includes 4 DIMMS, none of the applications of host OS 312 utilize the replaceable memory modules as four separate DIMMS. Accordingly, such applications are unable to ascribe errors to specific DIMMs. Through the operation of embodiments, errors reported in accessing replaceable memory modules are traced to a specific module, such as a specific DIMM, thus supporting the operation of additional diagnostic tools on a memory module that is the source of repeated errors.

As illustrated, architecture 300 includes IHS 301 (e.g., implementing aspects of IHS 100 and/or platform 200) coupled to storage device 302 (e.g., NVMe, SSD, etc.), secondary or companion IHS 303 (e.g., a smart phone, a laptop, etc.), and cloud or remote services 304. Cloud 304 may include backend or remote services 305, policy services 306, and web applications 307. In some cases, components of cloud 304 may be accessible to IHS 301 and/or secondary IHS 303, and configurable via ITDM management console 308. IHS architecture 301 may include hardware/EC/firmware layer 309, UEFI layer 107, and OS layer 311.

OS layer 311 includes a host OS (Operating System) 312 that is executed by host processor(s) 101. A variety of software applications may operate within the OS 312, where these applications may include user applications 313 and system applications 314, one or more OS telemetry applications 350. OS layer 311 may also include various drivers and other core OS operations, such as the operation of a kernel. In some embodiments, booting of the host OS 312 is selected based on selection of a boot device that includes the host OS boot code during the boot sequence of the IHS 100.

As described, various components of a heterogenous computing platform may independently run their own operating systems, such as a service OS 316 that is run by an SoC 200 that is used to implement the heterogenous computing platform. Within IHS architecture 301, some of these discrete operating systems operated by the heterogenous computing platform 200 may be considered service OSs 316, where each service OS may each include its own applications 317 and services 318.

UEFI layer 107 may include UEFI core services 319, UEFI NVRAM 320, and UEFI memory diagnostics 321. UEFI core services 319 may include operations for booting the IHS and for identifying and validating the detected hardware components of an IHS. Portions of NVRAM 320 may be utilized to store core UEFI instructions and to store variables that are used to set UEFI boot and runtime variables that may be used to configure settings of individual hardware components of an IHS 100, such as configurable firmware operations of hardware components.

As described in additional detail below, UEFI memory diagnostics 321 may operate during the IHS boot sequence in configuring diagnostic operations that utilize specially adapted memory device drivers that are used to access the replaceable memory modules. In particular, UEFI memory diagnostics 321 may interface with the memory device drivers in identifying faulty replaceable memory modules by retrieving handles provided by each driver, where the handle provides access to diagnostic APIs supported by each of the memory device drivers. In response to the detection of memory errors, the UEFI memory diagnostics 321 may utilize a handle to invoke the diagnostic API of a memory device driver in order to identify the specific replaceable memory module, such as a specific DIMM, that is the source of the error. The UEFI memory diagnostics 321 may track the memory modules that are identified as the source of reported errors in order to create a profile of the errors occurring in each individual replaceable memory modules. Although the individual errors do not represent faults or failures that render a memory module non-operational, a gradual increase in errors by a replaceable memory module may indicate performance of a memory module is degrading. Once embodiments have identified a specific replaceable memory module that is exhibiting errors indicative of possible failure or degradation, diagnostic tools may be deployed to further evaluate and possibly repair the identified memory module.

As illustrated, IHS architecture 301 also includes a hardware/EC/firmware layer 309 that includes EC 109 and sensor hub 207. As described above, EC 109 may implement a variety of procedures for management of individual hardware of an IHS 100 and of the IHS itself, including management of the various power states that are supported by the IHS. EC 109 is configured to execute one or more sensor services that interface with sensor hub 207 in implementing various features of an IHS 100, such response to user-presence determination by the sensor hub 207 that is acted upon by the EC 109 in initiation heightened security protocols. As described, EC 109 may interface with some or all of the individual hardware components/systems of an IHS via sideband management channels that are separate from inline communication channels used by the host processor 101 and SoCs.

As indicated in FIG. 3, EC 109 may support memory diagnostics 323. In providing remote management capabilities of an IHS 100 and of individual hardware components on the IHS, EC 109 may operate one or more sideband management signaling pathways. As described above, EC 109 may operate from a separate power plane from the main system resources of an IHS, such as processors 101 and heterogenous computing platform 200. Accordingly, EC 109 memory diagnostics 323 may implement procedures for tracking memory errors reported by components that are managed by EC 109, such as storage drives 113 and network controllers 105 of the IHS 100. EC memory diagnostics 323 may report detected memory errors to the UEFI memory diagnostics 321 for identification of the specific replaceable memory module that is the source of the error.

As described above, sensor hub 207 may receive inputs from some or all of the sensors 110A-N of an IHS 100. Sensor hub 207 may implement a variety of sensor service(s) 322 for communicating with and collecting data from sensors 110A-N. In some embodiments, sensor hub 207 may implement shock detection procedures that may incorporate inputs from inertial and other sensors 110A-N of an IHS. Such shock detection procedures may detect shocks experienced by an IHS 110 and may characterize and assess detected shocks in evaluating possible damage to the IHS.

Figure 4:
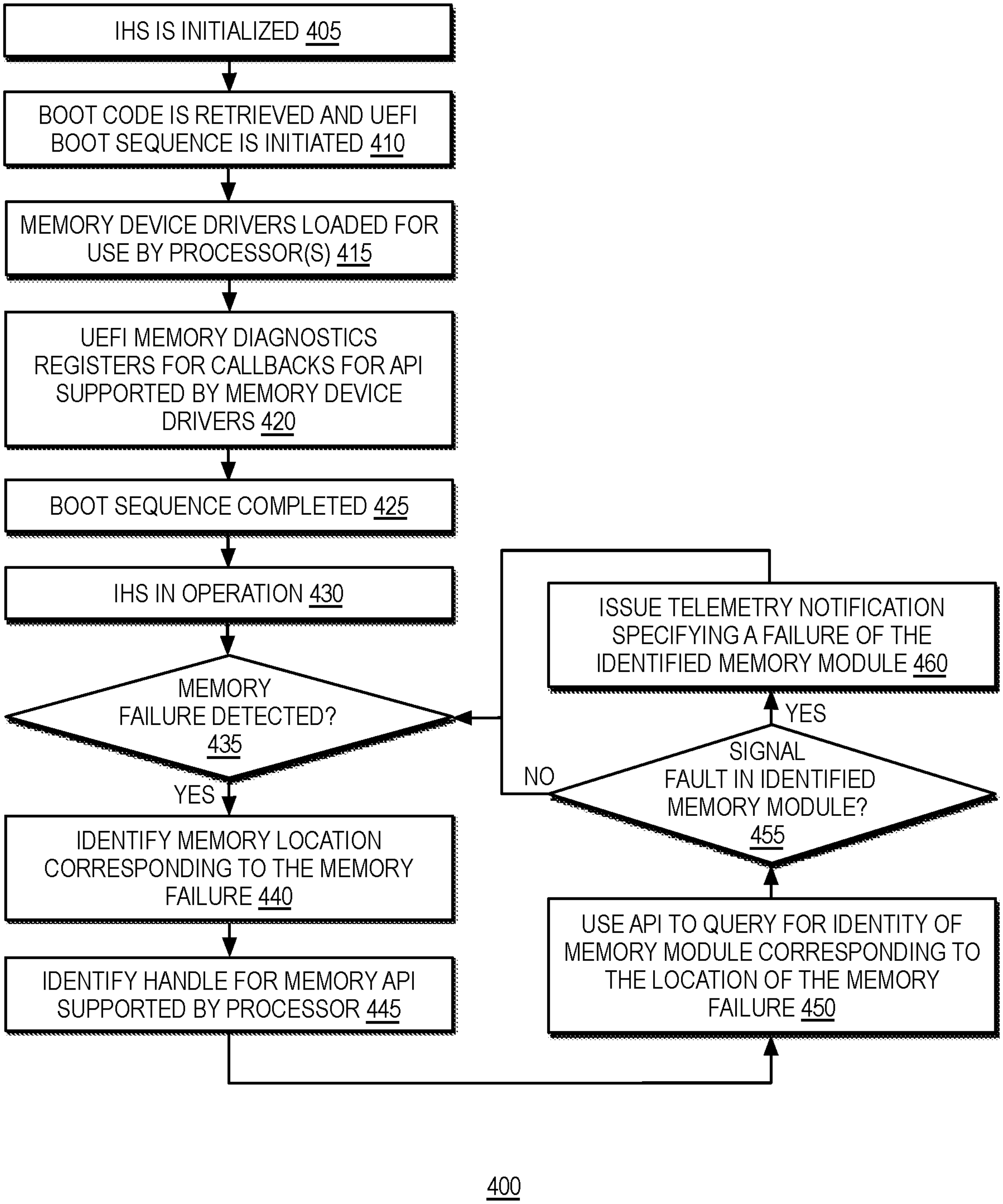
FIG. 4 is a diagram illustrating an example of a method, according to some embodiments, for supporting memory diagnostic operations by an IHS.

FIG. 4 is a diagram illustrating an example of a method, according to some embodiments, for supporting memory diagnostic operations by an IHS. Embodiments may begin, at 405, with the initialization of an IHS 100 that includes a heterogenous computing platform 200. Upon being powered, at 410, secured boot instructions are accessed in order to initialize a host processor 101 and to locate instructions, in some embodiments stored in UEFI NVRAM 320, for initiating a UEFI boot sequence. The UEFI boot sequence may be described as a series of phases, where successful completion of one phase is generally required for the operation of subsequent phases of the boot sequence.

These boot instructions of the initial phase may be used to validate the authenticity of host processor(s) 101, chipset 102, and the motherboard on which the processor is mounted. For instance, during the initial phase of the boot sequence (sometimes referred to as the SEC phase), some processors may support configurations of the use of onboard cache memories of a processor to be used as system memory (i.e., CAR, Cache as RAM) in order to facilitate faster booting of the IHS. Different processors may support different CAR settings, such as the number and size of cache memory banks that are available for use as system memory. In some embodiments, memory device drivers for use of processor cache memories may be instrumented to support a memory diagnostic API used to diagnose memory failures occurring during use of these cache memories as system memory.

Next, the UEFI boot sequence enters the PEI (Pre-EFI Initialization) phase. During this phase, initialization of authenticated host processor(s) 101, chipset 102 and the motherboard is completed, along with the initialization of system memory 103 that may include one or more replaceable memory modules. As part of the initialization of system memory 103, at 415, one or more memory device drivers may be loaded, where each memory device driver is instrumented to support a memory diagnostic API that may be utilized by embodiments in diagnosing reported memory failures, in particular in identifying specific replaceable memory modules used as part of the system memory 103 and that are the source of repeated memory errors and thus may be failing.

Upon loading of each of these memory device drivers, at 420, embodiments may configure use of the API by the UEFI memory diagnostics 321. In particular, the UEFI memory diagnostics 321 may register for a callback that may notify the UEFI memory diagnostics 321 when various conditions are detected by the memory device driver. For instance, the callback may register the UEFI memory diagnostics 321 for notification of memory faults or other errors detected by the memory device driver. The callback may additionally or alternatively register the UEFI memory diagnostics 321 for notifications of telemetry collected by the memory device driver, such as statistics relating the number and frequency of read and write operations by the memory device driver and the statistics relating the identities of processes from which read, write and other requests are received by the memory device driver. In some embodiments, this callback may return to the UEFI memory diagnostics 321 a handle to the diagnostic API that is supported by the memory device driver. Using such information, UEFI memory diagnostics 321 may determine when errors by a specific replaceable memory module warrant further diagnostic evaluation.

With the memory device drivers loaded and callbacks used to register for notifications to the UEFI memory diagnostics 321, the boot sequence of the IHS may continue. Accordingly, execution of UEFI 107 firmware boot code may enter the Driver Execution (DXE) phase, where images of bus and additional hardware device drivers are retrieved and initialized. Upon entering the DXE phase of the boot sequence, a variety of additional hardware may be initialized. User I/O hardware 106 drivers, such as a keyboard and display, may be activated. Activation of bus drivers may entail initial activation of various hardware of the IHS, and/or additional configuration of hardware setting used by the chipset and/or processors. Accordingly, a variety of different hardware may be configured during the DXE phase, with different processor architectures supporting different configurations. If any additionally memory device drivers are loaded, those drivers are instrumented to support a memory diagnostic API that may be utilized by embodiments in diagnosing reported memory failures, and callbacks are utilized by the UEFI memory diagnostics 321 to obtain a handle to the diagnostic API and to register for diagnostic notifications from the memory device driver.

Execution of UEFI 107 firmware may next enter the System Management Mode (SMM) phase, where images for additional firmware drivers are retrieved and initiated. Based on the loading of these drivers, various hardware of the IHs may be initialized and may be operational, such as network controller 105, sensors 110 and storage drives 113 from which OS boot instructions will be retrieved. With core hardware and bus drivers loaded and operating, BDS (Boot Device Selection) operations may be initiated and the location of the OS boot code is identified. In some instances, memory and disk space may be allocated for booting of the host OS 312 corresponding to the identified boot code. With the OS identified and booted, at 425, the boot sequence is completed.

Once booted, at 430, the IHS enters normal operations with the host OS 312 initialized and running. The IHS may operate in this manner for any amount of time until, at 435, a memory error is detected. Memory errors may be reported by a variety of sources that may be monitored by the UEFI memory diagnostics 321. For instance, UEFI memory diagnostics 321 may register for notifications from OS telemetry 350 of any reported failures related to system memory 103, and in particular to replaceable memory (e.g., DIMM, cDIMM) in use by the IHS. Such failures may thus originate from the OS and any of the applications operating within an OS, whether the host OS 312 or a service OS 316. In some embodiments, EC 109 may operate a memory diagnostics module 323 that monitors for memory errors, such as utilizing sideband management capabilities of EC 109 described above. In some embodiments, UEFI memory diagnostics 321 may receive notification of memory failures via the callbacks configured with each of the memory device drivers.

Through such mechanisms, embodiments may monitor for variety of memory errors. For instance, embodiments may monitor for reported parity errors resulting from discrepancies between stored data and parity bits stored in memory. Embodiments may monitor for reported uncorrectable memory errors indicating a memory error that cannot be correct using error correction codes (ECC) or other mechanisms utilized by a memory module. Embodiments may monitor for memory address errors that signify a detected issue with a memory address being accessed, potentially indicating a fault in the memory module or its addressing circuitry. All such errors may be indicative of a memory module beginning to fail, but the modules is still operational and not in a general fault or error state. Once a specific memory module is identified as the source of repeated errors, a variety of tools may be used to address such issues, such as auto-healing algorithms that implement advanced error correction capabilities that can be used to prolong the life of memory modules.

Upon detecting a memory error, 440, embodiments may identify one or more memory addresses that are related to the error. In some instances, the error message itself may specify a memory address, such as reported address error. In some instances, additionally queries may be required to resolve a memory address for a reported memory error. With one or more memory addresses related to the error identified, at 445, the memory device driver for accessing the memory address is identified and the handle for accessing the diagnostic API supported by that device driver is retrieved.

As described, embodiments may support memory diagnostics for multiple computing architectures. Embodiments may thus identity the architecture (e.g., x86, ARM) of the processor used to boot the IHS and that is utilizing the loaded memory device drivers that have been instrumented to support the diagnostic API. Accordingly, embodiments may retrieve the handle API of the memory device driver used by the processor used to boot the IHS such that embodiments may support different processor architectures by instrumenting memory device drivers used by each architecture as described herein.

Once the handle of the operative memory device driver has been identified, at 450, the API that is accessed using the handle is invoked to identify a specific memory module corresponding to the address of the reported memory failure. As described above, multiple memory device drivers may be loaded during the boot sequence, where different drivers may provide different components of the IHS 100 with access to replaceable memory modules. As such, embodiments may manage multiple such handles concurrently and thus identifies the correct handle for diagnosis of the reported memory error based on the identified memory address. Using the API that is accessed via the retrieved handle, embodiments determine one or more specific replaceable memory modules that are the source of the reported memory error.

Upon identifying the replaceable memory module that is the source of the reported error, at 455, embodiments determine whether to signal a fault or other error condition in the identified replaceable memory module. In some instances, a replaceable memory module may exhibit occasional errors that are spurious in nature and do not warrant initiating diagnostic operations. As such, embodiments may track the memory errors that are reported and resolved to a specific memory module over time to maintain a moving average of errors reported for each specific replaceable memory module of an IHS. In such embodiments, diagnostic operations may be delayed for an individual replaceable memory module until the moving average for memory errors that have been attributed to that module exceed a threshold level.

As indicated in FIG. 4, in scenarios where no fault or error in the replaceable memory module is being signaled, embodiments continue, at 435, to monitor for additional reported memory errors. With each reported memory error that is reported and tracked, the UEFI memory diagnostics 321 builds a history of errors associated with each replaceable memory module of an IHS. Based on this history of reported memory errors, at 460, embodiments may signal a variety of notifications related to replaceable memory module, where the notifications specify a specific replaceable memory module that is exhibiting errors and that should be subject to additional diagnostic operations.

In some embodiments, warnings of degraded performance of a specific replaceable memory module may be generated and distributed using OS telemetry 350 which may be monitored by a variety of automated and manual administrative tools. For instance, warnings of degraded performance by a specific replaceable memory module may be issued through telemetry 350 and/or received as a warning in a management console 308, thus providing an administrator with notice that the replaceable memory module may be failing and may thus need replacement in the near future.

To implement various operations described herein, computer program code (i.e., program instructions for carrying out these operations) may be written in any combination of one or more programming languages, including an object-oriented programming language such as Java, Smalltalk, Python, C++, or the like, conventional procedural programming languages, such as the "C" programming language or similar programming languages, or any of machine learning software. These program instructions may also be stored in a computer readable storage medium that can direct a computer system, other programmable data processing apparatus, controller, or other device to operate in a particular manner, such that the instructions stored in the computer readable medium produce an article of manufacture including instructions which implement the operations specified in the block diagram block or blocks.

Program instructions may also be loaded onto a computer, other programmable data processing apparatus, controller, or other device to cause a series of operations to be performed on the computer, or other programmable apparatus or devices, to produce a computer implemented process such that the instructions upon execution provide processes for implementing the operations specified in the block diagram block or blocks.

Modules implemented in software for execution by various types of processors may, for instance, include one or more physical or logical blocks of computer instructions, which may, for instance, be organized as an object or procedure. Nevertheless, the executables of an identified module need not be physically located together but may include disparate instructions stored in different locations which, when joined logically together, include the module and achieve the stated purpose for the module. Indeed, a module of executable code may be a single instruction, or many instructions, and may even be distributed over several different code segments, among different programs, and across several memory devices.

Similarly, operational data may be identified and illustrated herein within modules and may be embodied in any suitable form and organized within any suitable type of data structure. Operational data may be collected as a single data set or may be distributed over different locations including over different storage devices.

Reference is made herein to "configuring" a device or a device "configured to" perform some operation(s). It should be understood that this may include selecting predefined logic blocks and logically associating them. It may also include programming computer software-based logic of a retrofit control device, wiring discrete hardware components, or a combination of thereof. Such configured devices are physically designed to perform the specified operation(s).

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs.

As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

The invention claimed is:

1. An Information Handling System (IHS), that comprises:

one or more replaceable memory modules;

one or more memory devices; and one or more processors coupled to the one or more memory devices, wherein the one or more memory devices comprise instructions that, upon execution by the one or more processors, cause the IHS to:

load a plurality of memory device drivers for access to the one or more replaceable memory modules, wherein each memory device driver supports a respective diagnostic Application Program Interface (API);

detect, by a Unified Extensible Firmware Interface (UEFI) memory diagnostics module, a memory error that results from an attempt to access the one or more replaceable memory modules, based at least in part on a callback registered with the UEFI memory diagnostics module to receive memory error notifications from a respective one of the plurality of memory device drivers and return a handle to the respective diagnostic API supported by the respective one of the plurality of memory device drivers;

determine a memory address associated with the memory error;

identify, based on the memory address, a first memory device driver of the plurality of memory device drivers for access to the memory address, and retrieve the handle to the respective diagnostic API supported by the first memory device driver;

utilize, via the handle, the respective diagnostic API supported by the first memory device driver to identify a first of the one or more replaceable memory modules that correspond to the memory address as a source of the memory error;

issue, via Operating System (OS) telemetry, a notification configured to specify a failure of the first of the one or more replaceable memory modules; and in response to the failure, repair the first of the one or more replaceable memory modules, based at least in part, on a diagnostic tool.

2. The IHS of claim 1, wherein the memory device drivers are loaded as part of a boot sequence of the IHS.

3. The IHS of claim 2, wherein the boot sequence comprises a UEFI boot sequence.

4. The IHS of claim 1, wherein at least one of the plurality of loaded memory device drivers is selected to correspond to a computer architecture of the one or more processors.

5. The IHS of claim 4, wherein the computer architecture of the one or more processors comprises x86 or Advanced Reduced Instruction Set Computer Machine (ARM).

6. The IHS of claim 1, wherein the IHS further comprises an embedded controller that operates from a separate power plane from the one or more processors, wherein the embedded controller identifies the detected memory error in management of the one or more replaceable memory modules.

7. The IHS of claim 1, wherein the memory error comprises an error that resulted from an attempt to read or write to the memory address.

8. The IHS of claim 1, wherein execution of the instructions by the one or more processors further causes the IHS to track memory errors attributed to each of the one or more replaceable memory modules.

9. The IHS of claim 8, wherein execution of the instructions by the one or more processors further causes the IHS to signal a fault in the first of the one or more replaceable memory modules when the tracked memory errors attributed to the first of the one or more replaceable memory modules are in excess of a threshold level.

10. The IHS of claim 9, wherein the fault is signaled in the first of the one or more replaceable memory modules when a moving average of the tracked memory errors attributed to the first of the one or more replaceable memory modules are in excess of the threshold level over a time interval.

11. The IHS of claim 9, wherein diagnostic operations on the first of the one or more replaceable memory modules are delayed until a moving average of tracked memory errors reported for the first of the one or more replaceable memory modules is determined to reach the threshold level.

12. The IHS of claim 1, wherein execution of the instructions by the one or more processors further causes the IHS to request a handle to the respective diagnostic API from each of the one or more memory device drivers.

13. The IHS of claim 12, wherein the handle to the respective diagnostic API is utilized to identify the first of the replaceable memory modules as the source of the memory error.

14. A method for memory diagnostics by an Information Handling System (IHS), the method comprising:

loading a plurality of memory device drivers for accessing one or more replaceable memory modules, each memory device driver supporting a respective diagnostic Application Program Interface (API);

detecting, by a Unified Extensible Firmware Interface (UEFI) memory diagnostics module, a memory error resulting from an attempt to access the one or more replaceable memory modules, based at least in part on a callback registered with the UEFI memory diagnostics module to receive memory error notifications from a respective one of the plurality of memory device drivers and return a handle to the respective diagnostic API supported by the respective one of the plurality of memory device drivers;

determining a memory address associated with the memory error;

identifying, based on the memory address, a first memory device driver of the plurality of memory device drivers for accessing the memory address, and retrieving the handle to the respective diagnostic API supported by the first memory device driver;

utilizing, via the handle, the respective diagnostic API supported by the first memory device driver to identify a first of the one or more replaceable memory modules corresponding to the memory address as a source of the memory error;

issuing, via Operating System (OS) telemetry, a notification specifying a failure of the first of the one or more replaceable memory modules; and in response to the failure, repairing the first of the one or more replaceable memory modules, using a diagnostic tool.

15. The method of claim 14, wherein the memory device drivers are loaded as part of a boot sequence of the IHS.

16. The method of claim 14, wherein at least one of the plurality of loaded memory device drivers is selected to correspond to a computing architecture of one or more processors used to boot the IHS.

17. The method of claim 14, further comprising requesting a handle to the respective diagnostic API from each of the plurality of memory device drivers.

18. A non-transitory storage device that comprises instructions stored thereon, wherein execution of the instructions by one or more processors of an Information Handling System (IHS) causes the one or more processors to:

load a plurality of memory device drivers for access to one or more replaceable memory modules, wherein each memory device driver supports a respective diagnostic Application Program Interface (API);

detect, by a Unified Extensible Firmware Interface (UEFI) memory diagnostics module, a memory error that resulted from an attempt to access the one or more replaceable memory modules, based at least in part on a callback registered with the UEFI memory diagnostics module to receive memory error notifications from a respective one of the plurality of memory device drivers and return a handle to the respective diagnostic API supported by the respective one of the plurality of memory device drivers;

determine a memory address associated with the memory error;

identify, based on the memory address, a first memory device driver of the plurality of memory device drivers for access to the memory address, and retrieve the handle to the respective diagnostic API supported by the first memory device driver;

utilize, via the handle, the respective diagnostic API supported by the first memory device driver to identify a first of the one or more replaceable memory modules that correspond to the memory address as a source of the memory error;

issue, via Operating System (OS) telemetry, a notification configured to specify a failure of the first of the one or more replaceable memory modules; and in response to the failure, repair the first of the one or more replaceable memory modules, based at least in part, on a diagnostic tool.

19. The non-transitory storage device of claim 18, wherein the memory device drivers are loaded as part of a boot sequence of the IHS.

20. The non-transitory storage device of claim 18, wherein at least one of the plurality of loaded memory device drivers is selected to correspond to a computer architecture of the one or more processors configured to boot the IHS.

* * * * *